(12) United States Patent
Ishifuro

(10) Patent No.: US 11,659,635 B2
(45) Date of Patent: May 23, 2023

(54) HEATING COOKING APPARATUS AND HEATING COOKING METHOD

(71) Applicant: SHARP KABUSHIKI KAISHA, Sakai (JP)

(72) Inventor: Katsumi Ishifuro, Nara (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 412 days.

(21) Appl. No.: 17/118,347

(22) Filed: Dec. 10, 2020

(65) Prior Publication Data

US 2021/0227651 A1 Jul. 22, 2021

(30) Foreign Application Priority Data

Jan. 22, 2020 (JP) .............................. JP2020-008523

(51) Int. Cl.
*H05B 6/68* (2006.01)
*H05B 6/64* (2006.01)
*H04N 7/18* (2006.01)

(52) U.S. Cl.
CPC ............. *H05B 6/687* (2013.01); *H04N 7/183* (2013.01); *H05B 6/681* (2013.01)

(58) Field of Classification Search
CPC .... G06F 30/367; H04N 7/183; H05B 6/6447; H05B 6/681; H05B 6/687

USPC ....... 219/715, 702, 704, 705, 707, 711, 714, 219/716, 720, 749, 754, 762, 685
See application file for complete search history.

(56) References Cited

U.S. PATENT DOCUMENTS 10,674,568 B2 * 6/2020 Noda ........................ H05B 6/80
2013/0306627 A1 * 11/2013 Libman .................. H05B 6/687
219/709

FOREIGN PATENT DOCUMENTS

JP 10-160166 A 6/1998

* cited by examiner

*Primary Examiner* — Quang T Van
(74) *Attorney, Agent, or Firm* — ScienBiziP, P.C.

(57) ABSTRACT

A heating cooking apparatus includes a microwave supply unit, an image capturing unit, a communication unit, and a controller. The microwave supply unit supplies microwaves to an object to be heated and heats the object to be heated. The image capturing unit captures an image of the object to be heated. The communication unit transmits an image capturing result generated by the image capturing unit to a server. The controller controls the microwave supply unit such that an intensity of microwaves is reduced to be less than an intensity of microwaves before the communication unit transmits the image capturing result while the communication unit transmits the image capturing result to the server. After the communication unit transmits the image capturing result, the controller controls the microwave supply unit such that at least one of an intensity of microwaves or a supply time period of the microwaves is increased.

8 Claims, 6 Drawing Sheets

HEATING COOKING APPARATUS AND HEATING COOKING METHOD

CROSS-REFERENCE TO RELATED APPLICATIONS

This application claims the benefit of priority to Japanese Patent Application Number 2020-008523 filed on Jan. 22, 2020. The entire contents of the above-identified application are hereby incorporated by reference.

BACKGROUND

Technical Field

The disclosure relates to a heating cooking apparatus and a heating cooking method.

The high-frequency heating cooking system described in JP H10-160166 A is composed of a microwave oven (heating cooking apparatus) and a remote controller (external apparatus). The microwave oven includes a magnetron, a heating controller, a camera unit, and an image signal transmission unit. The camera unit captures an image of food on a turntable. The image signal transmission unit transmits the image capturing result generated by the camera unit to the remote controller. The heating controller controls the driving of the magnetron such that power for heating is saved while the image signal transmission unit communicates with the remote controller, and thereby prevents radio wave interference in wireless communication between the image signal transmission unit and the remote controller.

SUMMARY

However, in the high-frequency heating cooking system described in JP H10-160166 A, heating may be insufficient for the food (an object to be heated) due to power-saving during heating.

The disclosure takes the above-described problem into account, and an object thereof is to provide a heating cooking apparatus and a heating cooking method capable of preventing an object to be heated from being insufficiently heated while communication with an external apparatus is stabilized.

According to a first aspect of the present application, a heating cooking apparatus includes a microwave supply unit, an image capturing unit, a communication unit, and a controller. The microwave supply unit is configured to supply microwaves to an object to be heated and heats the object to be heated. The image capturing unit is configured to capture an image of the object to be heated. The communication unit is configured to transmit an image capturing result generated by the image capturing unit to an external apparatus. The controller controls the microwave supply unit such that an intensity of microwaves is reduced to be less than an intensity of microwaves before the communication unit transmits the image capturing result while the communication unit transmits the image capturing result to the external apparatus. After the communication unit transmits the image capturing result, the controller controls the microwave supply unit such that at least one of an intensity of microwaves or a supply time period of the microwaves is increased.

According to a second aspect of the present application, a heating cooking method includes supplying microwaves to an object to be heated, capturing an image of the object to be heated, transmitting an image capturing result of the object to be heated to an external apparatus, reducing an intensity of microwaves to be less than an intensity of microwaves before the image capturing result is transmitted while the image capturing result is transmitted to the external apparatus, and increasing at least one of an intensity of microwaves or a supply time period of the microwaves after the image capturing result of the object to be heated is transmitted.

According to the disclosure, the object to be heated can be prevented from being insufficiently heated while communication with the external apparatus is stabilized.

BRIEF DESCRIPTION OF DRAWINGS

The disclosure will be described with reference to the accompanying drawings, wherein like numbers reference like elements.

DESCRIPTION OF EMBODIMENTS

Figure 1:
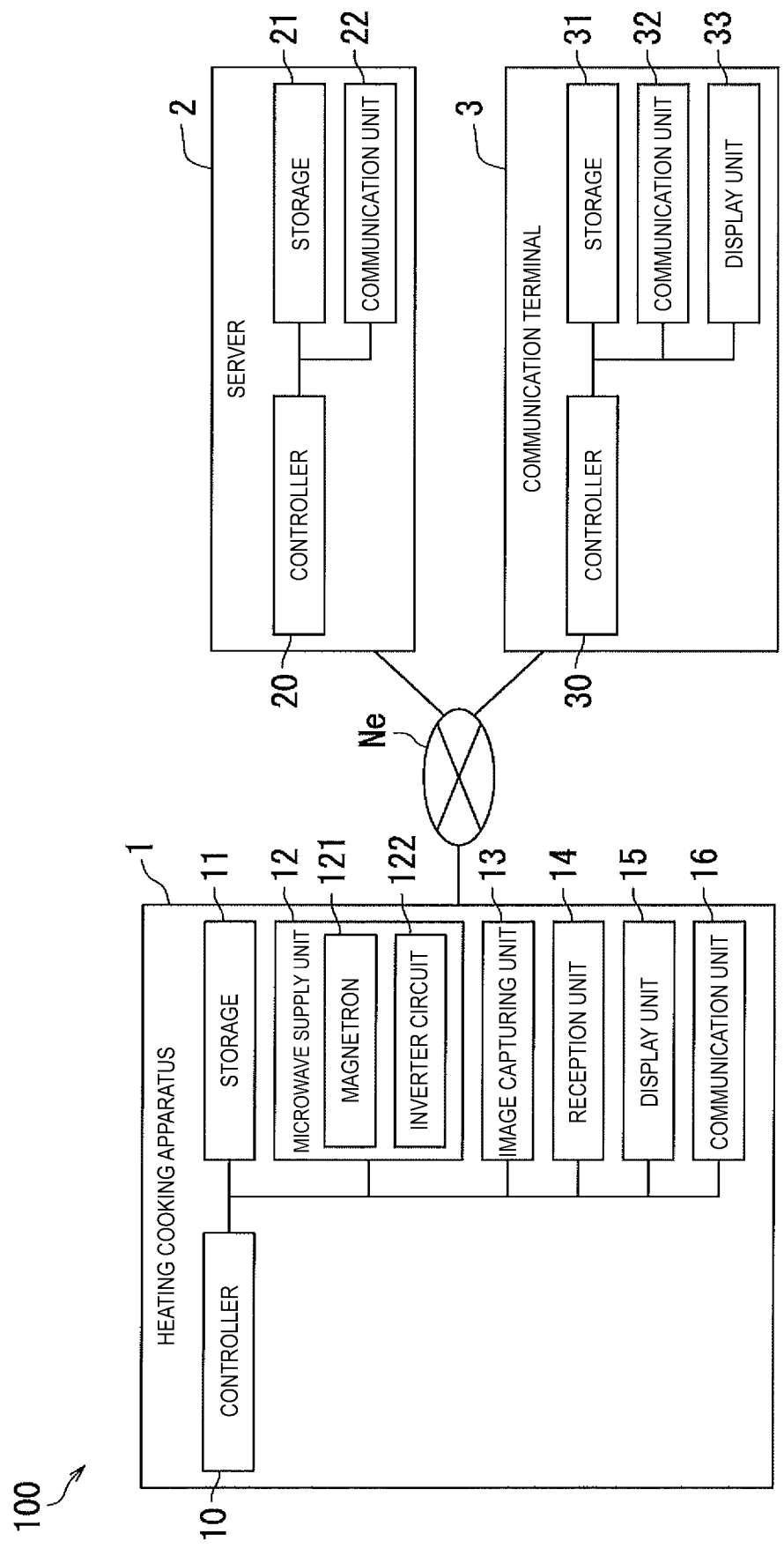
FIG. 1 is a diagram illustrating a configuration of a heating cooking system according to an embodiment of the disclosure.

Embodiments of the disclosure will be described with reference to the drawings. Note that, in the drawings, the same or equivalent components are denoted by the same reference signs and description thereof will not be repeated.

A heating cooking system 100 will be described with reference to FIG. 1. FIG. 1 is a diagram illustrating a configuration of the heating cooking system 100. The heating cooking system. 100 includes a heating cooking apparatus 1, a server 2, and a communication terminal 3. The heating cooking apparatus 1, the server 2, and the communication terminal 3 are communicably connected to each other via a network Ne. The network Ne is, for example, any of the Internet, a Local Area Network (LAN), and Wi-Fi (trademark). Various kinds of communication devices are connected to the network Ne. Examples of the various kinds of communication devices include routers, bridges, access points, hubs, and repeaters. In the present embodiment, radio waves in an industrial, scientific, and medical band at 2.4 GHz may be used for communication between the heating cooking apparatus 1, the server 2, and the communication terminal 3.

The heating cooking apparatus 1 is, for example, a microwave oven. The heating cooking apparatus 1 includes a controller 10, a storage 11, a microwave supply unit 12, an image capturing unit 13, a reception unit 14, a display unit 15, a communication unit 16, a body (not illustrated), and a heating chamber (not illustrated).

The body includes a housing and a lid. The body contains a heating chamber inside. The lid is attached to one end of the body. The lid is provided to be freely operable and closeable with respect to the body. An object to be heated is disposed in the heating chamber. The object to be heated is, for example, food.

The microwave supply unit 12 supplies microwaves to the object to be heated contained in the heating chamber and heats the object to be heated. In the present embodiment, the microwave supply unit 12 includes, for example, a magnetron 121 and an inverter circuit 122. The inverter circuit 122 is connected to an AC power supply, and converts the AC power supply voltage to a DC power supply voltage to generate a drive voltage for driving the magnetron 121. The magnetron 121 generates microwaves on the basis of the drive voltage applied from the inverter circuit 122. Thus, an intensity F of the microwaves supplied by the microwave supply unit 12 can be adjusted.

The image capturing unit 13 is, for example, a camera. Specifically, the image capturing unit 13 is a camera including a Charge Coupled Device (COD) digital television camera. The image capturing unit 13 is, for example, installed outside the heating chamber to face an opening formed in a wall surface forming the heating chamber. The image capturing unit 13 captures an image of the object to be heated while the microwave supply unit 12 supplies microwaves to the object to be heated. In the present embodiment, the image capturing unit 13 periodically captures an image of the object to be heated. In other words, the image capturing unit 13 captures an image of the object to be heated each time a given time period Pt elapses. For example, the given time period Pt is 1 second.

The communication unit 16 wirelessly communicates with the server 2 via the network Ne, for example. The communication unit 16 transmits the image capturing result from the image capturing unit 13 to the server 2, for example. Specifically, the communication unit 16 transmits the image capturing result from the image capturing unit 13 to the server 2 via wireless communication. In the present embodiment, the communication unit 16 transmits the image capturing result from the image capturing unit 13 to the server 2, for example, each time the image capturing unit 13 captures an image of the object to be heated. More specifically, the communication unit 16 wirelessly transmits the image capturing result to a relay device such as a router connected to the Internet through near field wireless communication (e.g., Wi-Fi (trademark)). Then, the image capturing result is transmitted wirelessly from the relay device to the server 2.

The storage 11 includes a storage device, and stores computer programs such as software and various data. Specifically, the storage 11 includes a main storage device (e.g., semiconductor memory) such as a Read Only Memory (ROM) and a Random Access Memory (RAM), and an auxiliary storage device such as a solid-state drive and/or a hard disk drive. The storage 11 may include a removable medium. The storage 11 is an example of a storage medium (e.g., a non-transitory computer-readable storage medium).

The display unit 15 is installed on, for example, the lid included in the body. The display unit 15 is, for example, a liquid crystal display. The display unit 15 displays various images. Specifically, for example, the display unit 15 displays information indicating heating conditions of the object to be heated. The information indicating heating conditions of the object to be heated is, for example, at least one of the information indicating the intensity F of the microwaves supplied to the object to be heated (e.g., the unit is watts: W), and information indicating a supply time St in which microwaves are supplied to the object to be heated.

The reception unit 14 includes, for example, an operation key included in the heating cooking apparatus 1 or a touch panel provided on the display unit 15. Note that the heating cooking apparatus 1 may not include a touch panel. The operation key also Includes an input device such as a mouse and/or a keyboard. The reception unit 14 is, for example, operated by a user to receive in advance specification information regarding microwaves to be supplied to the object to be heated. The specification information indicates at least one of a specified time At in which microwaves are supplied to the object to be heated and a specified intensity F1 of the microwaves to be supplied to the object to be heated. The specified intensity F1 indicates an intensity F of the microwaves. The controller 10 predicts a predicted total amount of energy on the basis of the specification information. A predicted total amount of energy corresponds to an amount of energy of microwaves when microwaves are supplied to the object to be heated at a specified intensity F1 over the specified time At. For example, in a case where the specified time At of the specification information received by the reception unit 14 is 60 seconds and the specified intensity F1 is 800 W, the predicted total amount of energy of the microwaves predicted on the basis of the specification Information is 4800 J (joules). Note that the supply time St in which they microwave supply unit 12 supplies microwaves to the object to be heated corresponds to a heating time in which the object to be heated is heated. In addition, the intensity F of the microwaves supplied by the microwave supply unit 12 corresponds to a heating intensity with respect to the object to be heated.

The reception unit 14 may receive menu information. The menu information indicates a cooking method for the object to be heated, and includes information Indicating a supply time period St in which microwaves are supplied to the object to be heated and information indicating the intensity F of the microwaves. In other words, receiving the menu information in advance by the reception unit 14 corresponds to receiving advance, by the reception unit 14, the specification information regarding the microwaves to be supplied to the object to be heated.

The controller 10 includes a processor such as a Central Processing Unit (CPU) and a Micro Processing Unit (MPU). The processor of the controller 10 executes a computer program stored in the storage device of the storage 11 to control the storage 11, the microwave supply unit 12, the image capturing unit 13, the reception unit 14, the display unit 15, and the communication unit 16. Note that the processor corresponds to an example of a "computer".

Note that the storage 11 and the controller 10 may be constituted by integrated circuits such as Application Specific integrated Circuits (ASICs) or Field-Programmable Gate Arrays (FPGAs).

The controller 10 controls the microwave supply unit 12. Specifically, the controller 10 controls the microwave supply unit 12 on the basis of the specification information received by the reception unit 14. For example, in a case where the specified time At of the specification information received by the reception unit 14 is 60 seconds and the specified intensity F1 is 800 W, the controller 10 controls the microwave supply unit 12 such that microwaves of 800 W are supplied to the object to be heated for 60 seconds.

Note that the microwave supply unit 12 can supply microwaves with an intensity greater than a maximum value of the specified intensity F1 that the reception unit 14 can receive, for example, for a short period of time (e.g., 0.2 seconds). For example, in a case where the maximum value of the specified intensity F1 that the reception 14 can receive is 800 W, the controller 10 can control the microwave supply unit 12 such that microwaves are supplied with an intensity F of approximately 1000 W for a short period of time. In other words, in a case where the maximum value of the specified intensity F1 that the reception unit 14 can receive is 800 W, a local maximum value of the intensity F of microwaves that the microwave supply unit 12 can supply for a short period of time is 1000 W, for example. The local maximum value of the intensity F of the microwaves that the microwave supply unit 12 can supply for a short period of time is a fixed value depending on the performance of the microwave supply unit 12.

The server 2 includes a controller 20, a storage 21, and a communication unit 22. Note that the server 2 is an example of an "external apparatus".

The controller 20 includes a processor such as a CPU. The processor of the controller 20 executes a computer program stored in a storage device of the storage 21 to control the communication unit 22 and the storage 21.

A hardware configuration of the communication unit 22 is similar to a hardware configuration of the communication unit 16 of the heating cooking apparatus 1. The communication unit 22 wirelessly communicates with the heating cooking apparatus 1 or the communication terminal 3 via the network Ne, for example. The communication unit 22 receives an image capturing result of the image capturing unit 13 of the heating cooking apparatus 1, for example.

A hardware configuration of the storage 21 is similar to a hardware configuration of the storage 11 of the heating cooking apparatus 1, for example. The storage 21 stores computer programs and various data, for example. The storage 21 stores image capturing results that the communication unit 22 receives from the heating cooking apparatus 1, for example. In the present embodiment, each time the communication unit 22 receives an image capturing result from the heating cooking apparatus 1, the storage 21 replaces an image capturing result already stored with the image capturing result newly received by the communication unit 22 and stores the image capturing result. Note that the storage 21 may store all of the image capturing results received by the communication unit 22.

The communication terminal 3 is, for example, a smartphone or a tablet terminal. The communication terminal 3 includes a controller 30, a storage 31, a communication unit 32, and a display unit 33.

A hardware configuration of the storage 31 is similar to a hardware configuration of the storage 11 of the heating cooking apparatus 1, for example. The storage 31 stores computer programs and various data, example. The storage 31 stores image capturing results that the communication unit 32 receives from the server 2, for example.

The controller 30 includes a processor such as a CPU. The processor of the controller 30 executes a computer program stored in a storage device of the storage 31 to control the storage 31, the communication unit 32, and the display unit 33.

A hardware configuration of the communication unit 32 is similar to a hardware configuration of the communication unit 16 of the heating cooking apparatus 1. The communication unit 32 wirelessly communicates with the heating cooking apparatus 1 or the server 2 via the network Ne, for example. The communication unit 32 acquires the image capturing result of the object to be heated, which is heated by the heating cooking apparatus 1, stored in the storage 21 of the server 2. In the present embodiment, as long as an image capturing result of the object to be heated is newly stored in the storage 21 of the server 2, the communication unit 32 continues to acquire the image capturing result stored in the storage 21.

The display unit 33 is a liquid crystal display, for example. The display unit 33 displays the image capturing result received by the communication unit 32 from the server 2 and stored in the storage 31, for example. Specifically, each time the storage 31 newly stores an image capturing result, the display unit 33 displays the newly stored image capturing result. A user checks a state of the object to be heated that is heated by the heating cooking apparatus 1 by checking the image capturing results regularly updated and displayed by the display unit 33. That is, the user can monitor the cooking state of the food product being heated by the heating cooking apparatus 1.

Figure 2:
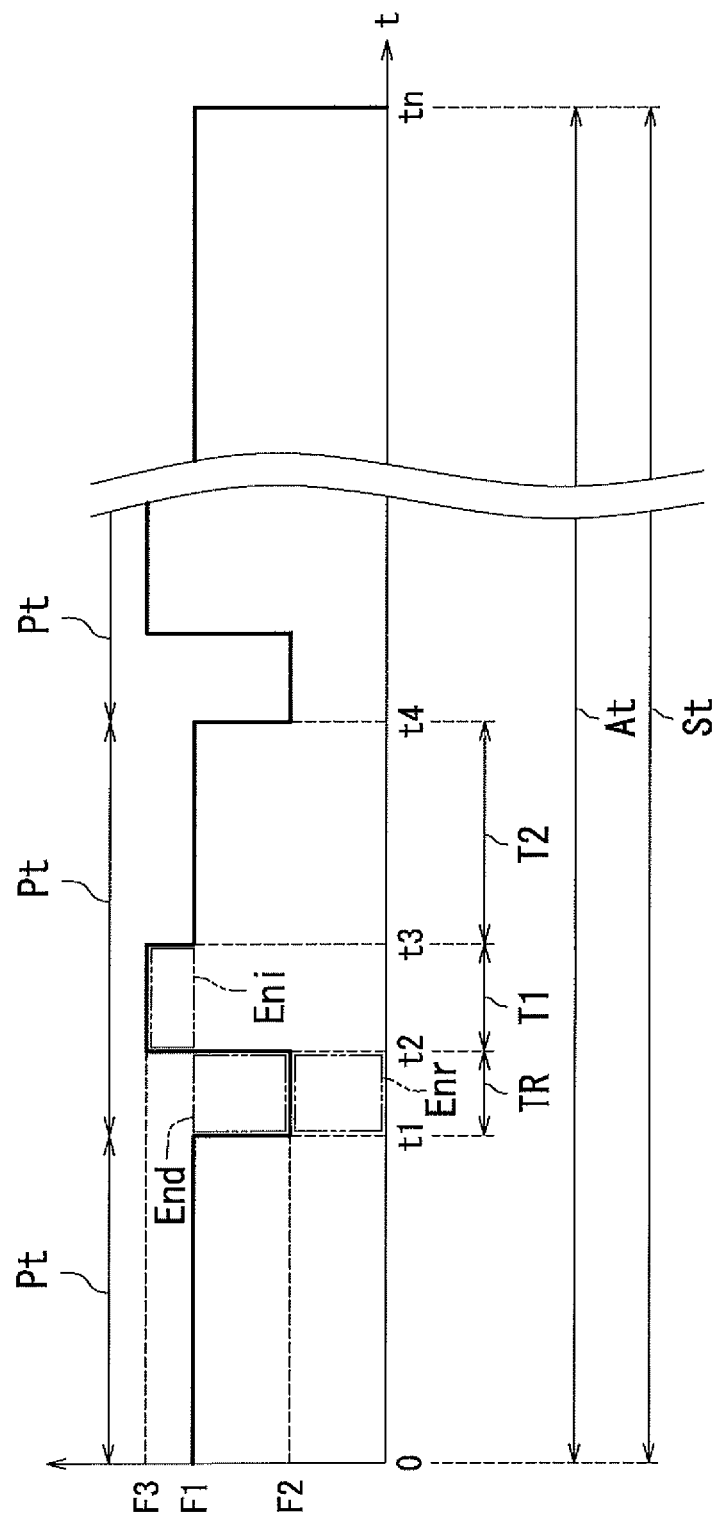
FIG. 2 is a diagram illustrating an example of fluctuations in an intensity of microwaves supplied by a microwave supply unit according to the present embodiment.
Figure 3:
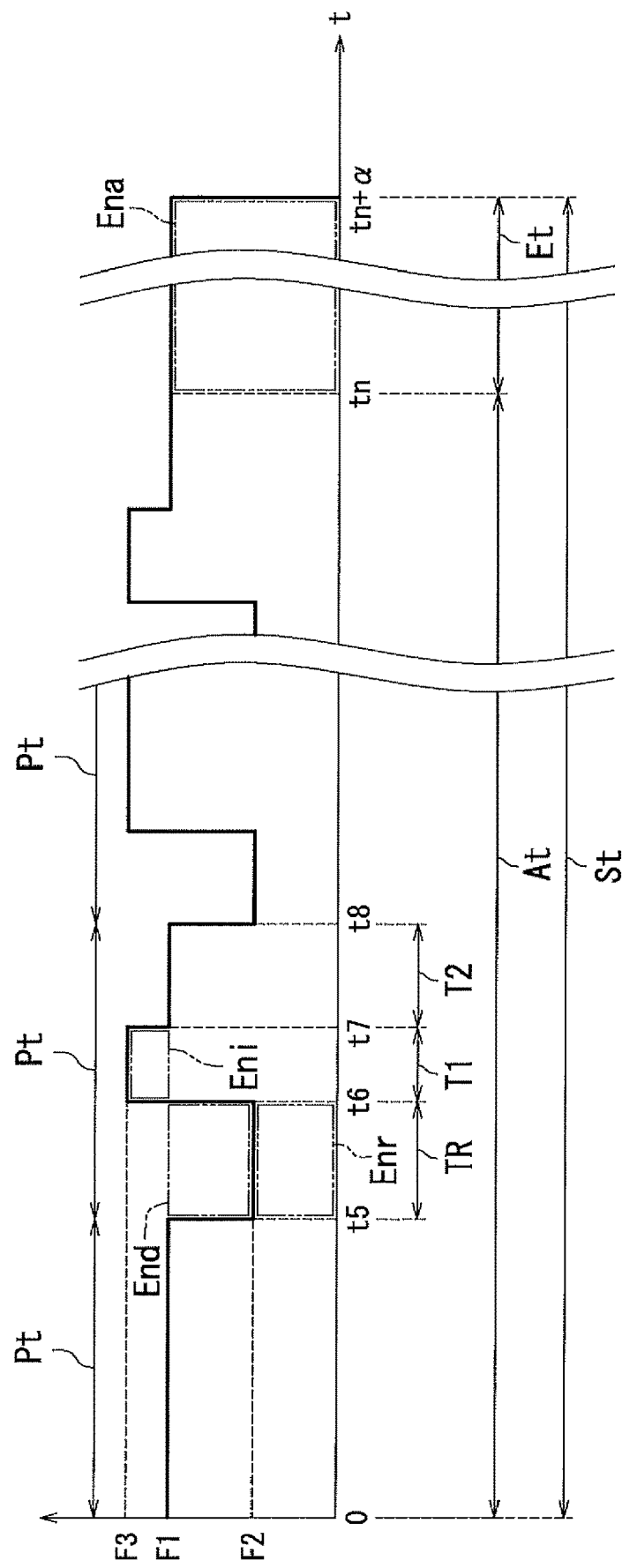
FIG. 3 is a diagram illustrating another example of fluctuations in an intensity of microwaves supplied by a microwave supply unit according to the present embodiment.
Figure 4:
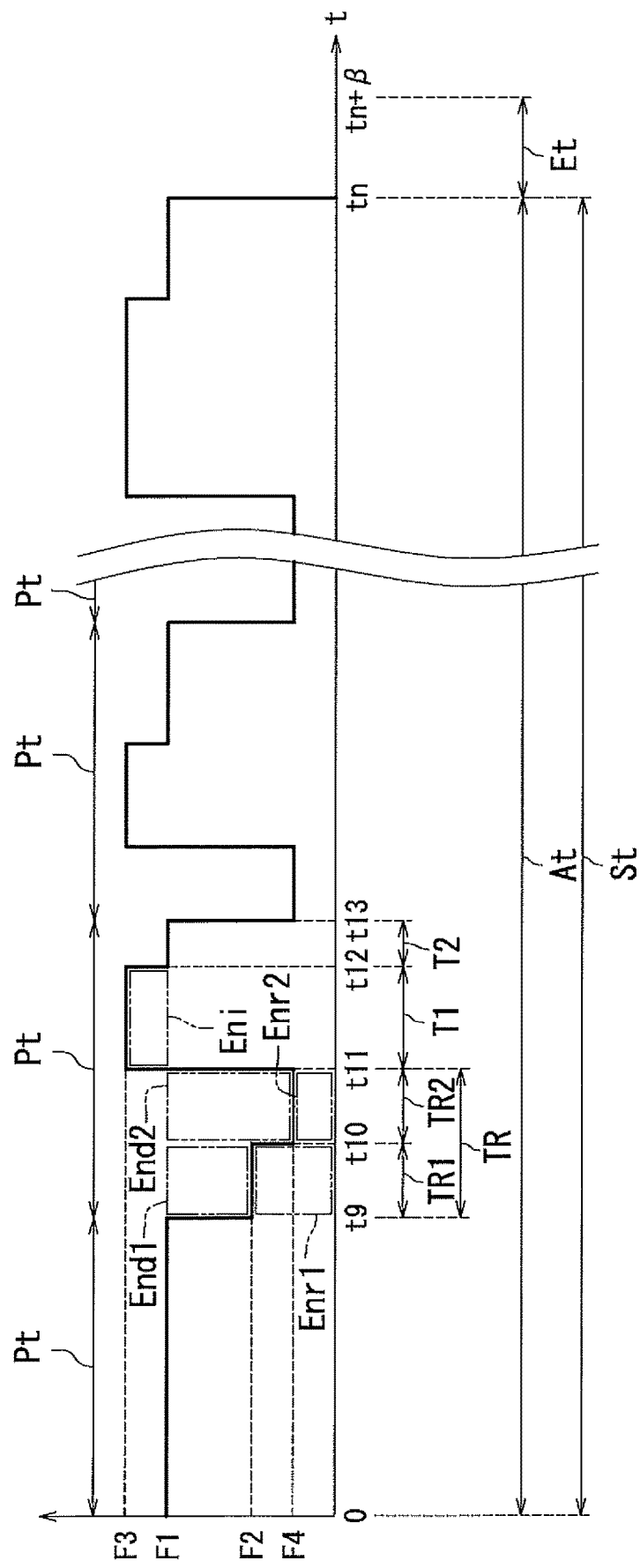
FIG. 4 is a diagram illustrating another example of fluctuations in an intensity of microwaves supplied by a microwave supply unit according to the present embodiment.

Next, microwaves supplied by the microwave supply unit 12 will be described with reference to FIGS. 2 to 4. Note that. FIGS. 2 to 4 conceptually illustrate fluctuations in an intensity F of microwaves supplied by the microwave supply unit 12, and do not illustrate actual waveforms. In FIGS. 2 to 4, the vertical axis indicates an intensity F of microwaves and the horizontal axis indicates time.

First, an example of fluctuations in the intensity F of microwaves supplied by the microwave supply unit 12 will be described with reference to FIG. 2. FIG. 2 is a diagram illustrating an example of fluctuations in the intensity F of microwaves supplied by the microwave supply unit 12. When a given time period Pt elapses after the microwave supply unit 12 starts supplying microwaves at a specified intensity F1, the image capturing unit 13 captures an image of the object to be heated. In response to the image capturing unit 13 capturing an image of the object to be heated, the communication unit. 16 transmits the image capturing result generated by the image capturing unit 13 to the server 2. In the example illustrated in FIG. 2, the communication unit 16 transmits the image capturing result to the server 2 from a time t1 to a time t2.

While the communication unit 16 transmits the image capturing result to the server 2, the controller 10 controls the microwave supply unit 12 such that the intensity F of the microwaves is reduced to be less than an intensity F of microwaves before the communication unit 16 transmits the image capturing result. This can suppress the microwaves generated by the microwave supply unit 12 from affecting communication between the communication unit 16 and the server 2. The reason for this is that a part or all of the frequency band of radio waves used in communication between the heating cooking apparatus 1 and the server 2 and the frequency band of microwaves supplied by the microwave supply unit 12 may overlap, and thus some of the microwaves that the microwave supply unit 12 supplies to the object to be heated may affect communication between the heating cooking apparatus 1 and the server 2. In the example illustrated in FIG. 2, at the time t1 when the give: time period Pt has elapsed, the controller 10 controls the microwave supply unit 12 such that the intensity F of the microwaves is reduced from a specified intensity F1 to a reduced intensity F2. Furthermore, the controller 10 controls the microwave supply unit 12 such that microwaves with the reduced intensity F2 that is less than the specified intensity F1 are supplied from the time t1 to the time t2. The reduced intensity F2 indicates an intensity F of the microwaves.

After the communication unit 16 transmits the image capturing result, the controller 10 controls the microwave supply unit 12 such that at least one of an intensity F of microwaves and a supply time period St of the microwaves is increased. Thus, the amount of energy of the microwaves increases after the communication unit 16 transmits the image capturing result. The increase in the amount of energy of the microwaves corresponds to stronger heating of the object to be heated. This can prevent the object to be heated from being insufficiently heated while influence of the microwaves supplied by the microwave supply unit 12 on communication between the communication unit 16 and the server 2 is suppressed. Specifically, at the time t2 at which the communication unit. 16 completes the transmission of the image capturing result, the microwave supply unit 12 is controlled such that the intensity F of the microwaves is increased from the reduced intensity F2 to an increased intensity F3. The increased intensity F3 indicates an intensity F of the microwaves and is greater than the specified intensity F1.

In addition, the controller 10 determines at least one of an intensity F of the microwaves after the communication unit 16 transmits the image capturing result and an extended time period Et for supplying the microwaves for an extended time period with respect to the specified time period At on the basis of a predicted total amount of energy predicted on the basis of the specification information received by the reception unit 14. Then, the controller 10 controls the microwave supply unit 12 on the basis of at least one of the intensity F of the microwaves and the extended time period Et determined by the controller 10. Thus, the microwave supply unit 12 can be controlled with reference to the predicted total amount of energy after the communication unit. 16 transmits the image capturing result. As a result, insufficient heating of the object to be heated can be accurately prevented.

For example, in a case where the predicted total amount of energy based on the specification information is 5000 J, the controller 10 determines at least one of the intensity F of the microwaves after the communication unit 16 transmits the image capturing result and the extended time period Ft such that the amount of energy of the microwaves supplied by the microwave supply unit 12 over a supply time period St approaches 5000 J. In the example illustrated in FIG. 2, the controller 10 controls the microwave supply unit 12 such that the intensity F of the microwaves after the communication unit 16 transmits the image capturing result is increased to over the specified intensity F1 while the supply time period St for the microwaves is maintained. In other words, in the example illustrated in FIG. 2, the controller 10 determines the intensity F of the microwaves after the communication unit 16 transmits the image capturing result.

In the present embodiment, the controller 10 has a timer function. For example, the controller 10 measures a reduction time period TR in which the intensity F of the microwaves supplied by the microwave supply unit 12 is reduced. Specifically, the controller 10 measures the reduction time period TR from the time t1 to the time which the microwave supply unit 12 supplies the microwaves with the reduced intensity F2.

After measuring the reduction time period TR, the controller 10 calculates an amount of energy Enr of the microwaves in the reduction time period TR on the basis of the reduction time period TR and the intensity F of the microwaves in the reduction time period TR. For example, the controller 10 multiplies the reduction time period TR by the reduced intensity F2 to calculate the amount of energy Enr of the microwaves in the reduction time period TR. Then, the controller 10 controls the microwave supply unit 12 such that the amount of energy of the microwaves after the communication unit 16 transmits the image capturing result increased on the basis of the amount of energy Enr in the reduction time period TR. Thus, the shortage in the amount of energy of the microwaves supplied to the object to be heated can be appropriately compensated for. As a result, insufficient heating of the object to be heated is appropriately prevented.

Specifically, the controller 10 calculates a first time period T1 in which microwaves are supplied with the increased intensity F3 after the communication unit 16 transmits the image capturing result, a second time period T2 in which microwaves are supplied with the specified intensity F1, and the extended time period Et on the basis of the amount of energy Enr of the microwaves in the reduction time period TR. At this time, the controller 10 determines a local maximum value of the intensity F of the microwaves which can be supplied by the microwave supply unit 23 for a short period of time as the increased intensity F3. More specifically, the controller 10 calculates the first time period T1, the second time period T2, and the extended time period Et on the basis of the amount of energy Enr of the microwaves in the reduction time period TR such that, for example, the sum of the reduction time period TR, the first time period T1, and the second time period T2 is substantially equal to the given time period Pt. Then, the controller 10 controls the microwave supply unit 12 on the basis of the determined increased intensity F3, and the calculated first time period T1, second time period T2, and extended time period Ft. Note that the extended time period Et may be 0 (zero).

Note that the controller 10 may calculate the increased intensity F3 after the communication unit 16 transmits the image capturing result on the basis of the amount of energy Enr of the microwaves in the reduction time period TR. In this case, the controller 10 calculates the increased intensity F3 after the communication unit 16 transmits the image capturing result, the first time period T1 in which the microwaves are supplied with the increased intensity F3, the second time period T2 in which the microwaves are supplied with the specified intensity F1, and the extended time period Et on the basis of the amount of energy Enr of the microwaves in the reduction time period TR. More specifically, the controller 10 calculates the increased intensity F3, the first time period T1, the second time period T2, and the extended time period Et on the basis of the amount of energy Enr of the microwaves in the reduction time period TR such that, for example, the sum of the reduction time period TR, the first time period T1, and the second time period T2 is substantially equal to the given time period Pt. Then, the controller 10 controls the microwave supply unit 12 on the basis of the calculated increased intensity F3, first time period T1, second time period T2, and extended time period Et. Specifically, for example, in a case where the local maximum value of the intensity F of the microwaves that the microwave supply unit 23 can supply is 1000 W and the maximum value of the specified intensity F1 that the reception unit 14 can receive is 800 W, the controller 10 may calculate the increased intensity F3 to be 900 W.

In the example illustrated in FIG. 2, on the basis of the amount of energy Enr of the microwaves in the reduction time period TR, the controller 10 increases the intensity F of the microwaves after the communication unit 16 transmits the image capturing result while maintaining the specified time period At. That is, in the example illustrated in FIG. 2, the extended time period Et is 0 (zero). Accordingly, a shortage in the amount of energy of the microwaves with respect to the object to be heated can be prevented while communication between the communication unit 16 and the server 2 is stabilized, without extending the specified time period At. As a result, insufficient heating of the object to be heated can be prevented while inconvenience for the user caused by extending the specified time period At is avoided and communication between the communication unit 16 and the server 2 is stabilized.

Here, the controller 10 may calculate a deficient amount of energy End of the microwaves supplied to the object to be heated in the reduction time period TR and calculate a supplementary amount of energy Eni in accordance with the calculated deficient amount of energy End. Specifically, the controller 10 subtracts the amount of energy Enr from an amount of energy of the microwaves that is supposed to be supplied in the reduction time period TR to calculate the deficient amount of energy End. The supplementary amount of energy Eni indicates an amount of energy increased with respect to the amount of energy of the microwaves supplied with the specified intensity F1 in the first time period T1 after the communication unit 16 transmits the image capturing result. Then, the controller 10 may calculate the increased intensity F3, the first time period T1, and the second time period T2 such that the supplementary amount of energy Eni is equal to the calculated deficient amount of energy End.

For example, in the example illustrated in FIG. 2, in a case where the specified intensity F1 is 800 W, the reduced intensity F2 is 400 W, the increased intensity F3 is 1000 W, the reduction time period TR is 0.1 seconds, the given time period Pt is 1 second, and the first time period T1 is 0.2 seconds, the deficient amount of energy End is 40 J. Then, the supplementary amount of energy Eni is 40 J. Therefore, insufficient heating of the object to be heated is prevented.

Next, another example of fluctuations in the intensity F of microwaves supplied by the microwave supply unit 12 will be described with reference to FIG. 3. FIG. 3 is a diagram illustrating another example of fluctuations in an intensity F of microwaves supplied by the microwave supply unit 12 according to the present embodiment. Note that, in another example illustrated in FIG. 3, the communication unit 16 transmits an image capturing result to the server 2 from a time t5 to a time t6. The time period from the time t5 to the time t6 is greater than the time period from the time t1 to the time t2 of FIG. 2. That is, the time period in which the communication unit 16 transmits the image capturing result to the server 2 in the example illustrated in FIG. 3 is greater than that in the example illustrated in FIG. 2.

The reduction time period TR in which the intensity F of the microwaves is reduced becomes longer as the time period in which the communication unit 16 transmits the image capturing result to the server 2 gets longer. Thus, in a case where the sum of the reduction time period TR, the first time period T1, and, the second time period T2 is set to be substantially equal to the given time period Pt, at least one of the first time period T1 and the second time period T2 becomes shorter as the reduction time period TR becomes longer. As a result, the amount of energy of the microwaves supplied over the specified time period At may be insufficient for the total predicted amount of energy. Thus, in the example illustrated in FIG. 3, the controller 10 calculates the increased intensity F3, the first time period T1, the second time period T2, and the extended time period Et to increase both the intensity F of the microwaves and the supply time period St for the microwaves after the communication unit. 16 transmits the image capturing result.

The controller 10 totals up extended time periods Et calculated at intervals of the given time period Pt. The controller 10 causes the storage 11 to store the total extended time period Et. Then, after the specified time period At elapses after the microwave supply unit 12 starts supplying microwaves, the controller 10 controls the microwave supply unit 12 such that microwaves are further supplied over the total extended time period Ft. In the example illustrated in FIG. 3, the time period from a time to to a time tn+α indicates the total extended time period Et. Insufficient heating of the object to be heated is prevented due to an additional amount of energy Ena of the microwaves in the extended time period Et. Note that, in the example illustrated in FIG. 3, the intensity F of the microwaves supplied over the extended time period Ft is the specified intensity F1. However, the intensity F of the microwaves supplied over the extended time period Ft may be the reduced intensity F2 or the increased intensity F3. Here, the supply time period St of the microwaves supplied by the microwave supply unit 12 is the sum of the specified time At received by the reception unit 14 and the extended time period Et.

In the extended time period Et, the display unit 15 displays a message indicating that heating of the object to be heated has been extended, for example. Thus, the user of the heating cooking apparatus 1 confirms the message displayed on the display unit 15 and thus can understand the state of the heating cooking apparatus 1.

Next, another example of fluctuations in the intensity F of the microwaves supplied by the microwave supply unit 12 will be described with reference to FIG. 4. FIG. 4 is a diagram illustrating another example of fluctuations in the intensity F of the microwaves supplied by the microwave supply unit 12. Note that, in the example illustrated in FIG. 4, the communication unit 16 transmits an image capturing result to the server 2 multiple times. Specifically, the communication unit 16 transmits an image capturing result to the server 2 multiple times during the reduction time period TR from a time t9 to a time t11. The intensity F of the microwaves supplied by the microwave supply unit 12 in a first reduction time period TF1 from the time t9 to a time t10 is the reduced intensity F2, and the intensity F of the microwaves supplied by the microwave supply unit 12 in a second reduction time period TR2 from the time t10 to the time t11 is a second reduced intensity F4 that is less than the reduced intensity F2. In other words, in the example illustrated in FIG. 4, the reduction time period TR is the sum of the first reduction time period TR1 and the second reduction time period TR2.

Here, the controller 10 may determine a local minimum value of the intensity F of the microwaves that the microwave supply unit 23 can supply as the second reduced intensity F4. The local minimum value of the intensity F of the microwaves that the microwave supply unit 12 can supply is a fixed value depending on the performance of the microwave supply unit 12.

The controller 10 reduces the intensity F of the microwaves supplied by the microwave supply unit 12 according to the transmission result of the image capturing result with respect to the server 2 from the communication unit 16. Thus, the microwaves supplied by the microwave supply unit 12 can be reliably prevented from affecting communication with the server 2.

Specifically, as illustrated in FIG. 4, in a case where the communication unit 16 attempts to transmit the image capturing result to the server 2 over the first reduction time period TR1 and fails to transmit the image capturing result to the server 2, the controller 10 controls the microwave supply unit 12 such that the intensity F of the microwaves is reduced to be less than the intensity F of the microwaves when the communication unit 16 fails to transmit the image capturing result to the server 2. In other words, in response to the communication unit 16 failing to transmit the image capturing result to the server 2, the controller 10 controls the microwave supply unit 12 such that the intensity F of the microwaves is reduced. In the example illustrated in FIG. 4, since the communication unit 16 fails to transmit the image capturing result to the server 2 while the microwave supply unit 12 supplies the microwaves with the reduced intensity F2, the microwave supply unit 12 is controlled such that the intensity F of the microwave is reduced from the reduced intensity F2 to the second reduced intensity F4. While the microwave supply unit 12 supplies the microwaves with the second reduced intensity F4 over the second reduction time period TR2, the communication unit 16 successfully transmits the image capturing result to the server 2.

The controller 10 calculates the increased intensity F3, the first time period T1, the second time period T2, and the extended time period Et after the communication unit 16 successfully transmits the image capturing result to compensate for a deficient amount of energy End1 in the first reduction time period TR1 and a deficient amount of energy End2 in the second reduction time period TR2. Then, the controller 10 controls the microwave supply unit 12 on the basis of the calculated increased intensity F3, first time period T1, second time period T2, and extended time period Et. As described with reference to FIG. 3, the controller 10 totals up extended time periods Et calculated at intervals of the given time period Pt.

In a case where the total extended time period Et is less than a predetermined time Qt, the controller 10 controls the microwave supply unit 12 to maintain the supply time period St. In other words, in a case where the extended time period Et is less than a predetermined time period Qt, the controller 10 controls the microwave supply unit 12 such that microwaves are supplied without extending the specified time period At. Therefore, the heating time of the object to be heated can be prevented from being undesirably extended. As a result, inconvenience for the user caused by extending the heating time of the object to be heated can be avoided. In the example illustrated in FIG. 4, the extended time period Et from a time tn to a time tn+β is less than the predetermined time period Qt. Thus, the controller 10 controls the microwave supply unit 12 such that e supply time period St is maintained. Note that, in a case where the extended time period Et is equal to or greater than the predetermined time period Qt, the controller 10 controls the microwave supply unit 12 such that microwaves are supplied to the object to be heated over the extended time period Et.

Here, the predetermined time period Qt is, for example, a time equivalent to 5% of the specified time period At. For example, in a case where the specified time period At is 60 seconds, the predetermined time period Qt is 3 seconds. Note that the predetermined time period Qt may be, for example, a minimum unit of the heating time that the reception unit 14 can receive. For example, in a case where the minimum unit of the heating time that the reception unit 14 can receive is 5 seconds, the predetermined time period Qt is also 5 seconds. Thus, the shortage in the amount of energy of the microwaves in the extended time period Et to the extent that the reception unit 14 cannot receive can be considered as a tolerance error of heating of the object to be heated. As a result, a heating time of the object to be heated can be prevented from being undesirably extended while preventing insufficient heating of the object to be heated.

Note that the controller 10 may calculate the increased intensity F3, the first time period T1, the second time period T2, and the extended time period Ft after the communication unit 16 successfully transmits the image capturing result on the basis of an amount of energy Enr1 in the first reduction time period TR1 and an amount of energy Enr2 in the second reduction time period TR2.

The storage 11 stores the intensity F of the microwaves when the communication unit 16 successfully transmits the image capturing result to the server 2. While the communication unit 16 transmits the image capturing result to the server 2, the controller 10 controls the microwave supply unit 12 such that the intensity F of the microwaves is reduced to the intensity F of microwaves stored in the storage 11. This can reliably prevent the microwaves supplied by the microwave supply unit 12 from affecting communication between the communication unit 16 and the server 2. For example, in the example illustrated in FIG. 4, at a time t13 at which a second given time period Pt has elapsed, the controller 10 controls the microwave supply unit 12 such that the intensity F of the microwaves supplied by the microwave supply unit 12 is reduced to the second reduced intensity F4 set for the time when communication by the communication unit 16 is successful.

Figure 5:
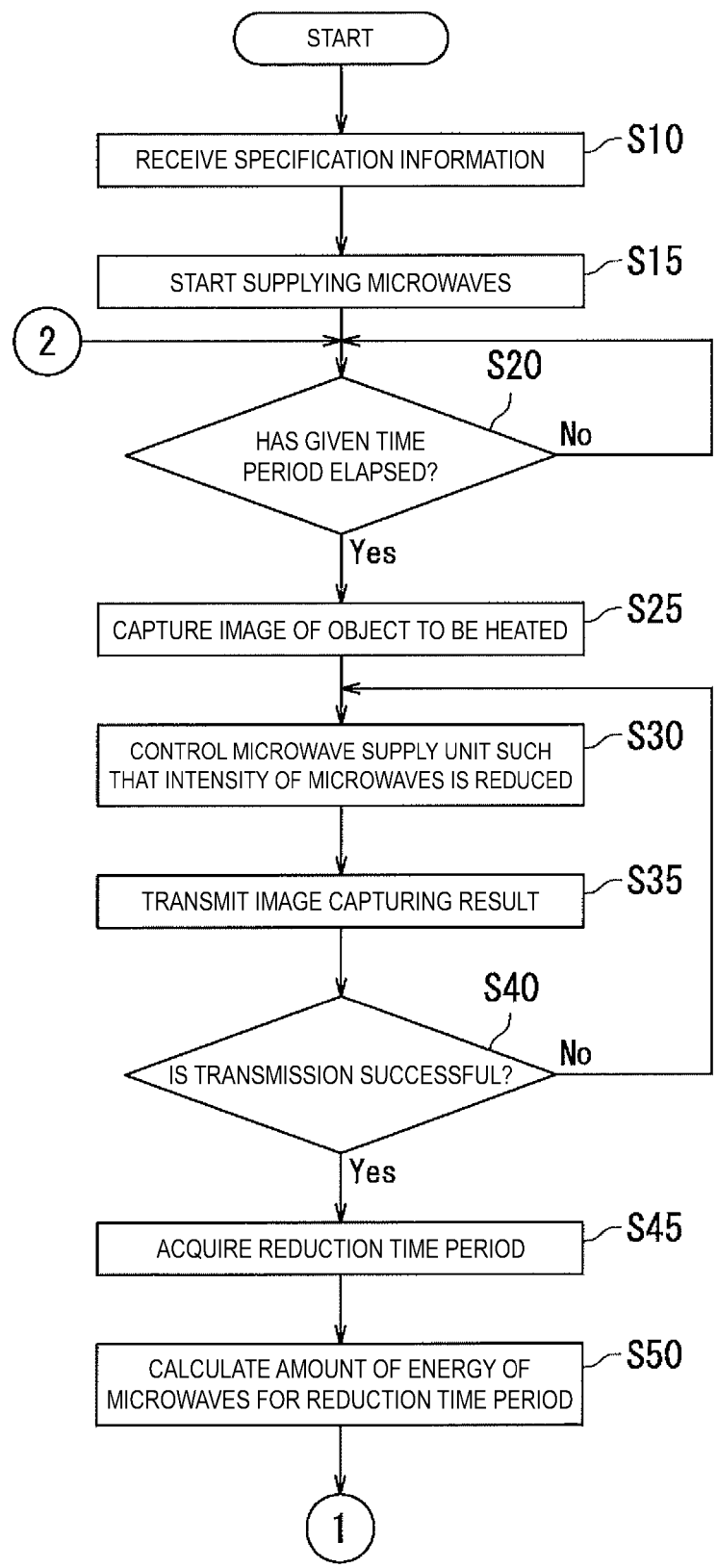
FIG. 5 is a flowchart illustrating the first half of a heating cooking method carried out by a heating cooking apparatus according to the present embodiment.
Figure 6:
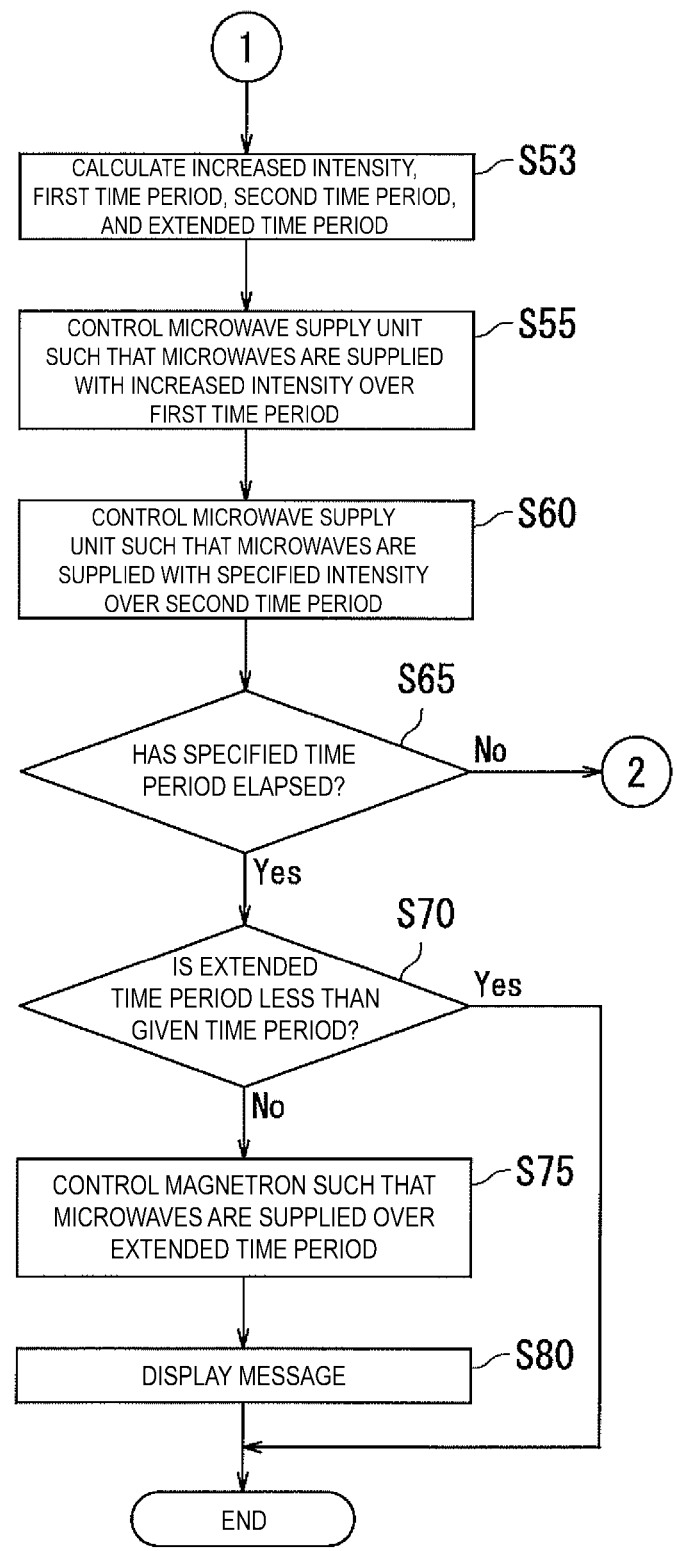
FIG. 6 is a flowchart illustrating the second half of the heating cooking method carried out by the heating cooking apparatus according to the present embodiment.

Next, a heating cooking method carried out by the heating cooking apparatus 1 will be described with reference to FIGS. 5 and 6. FIGS. 5 and 6 are flowcharts illustrating a heating cooking method carried out by the heating cooking apparatus 1. The heating cooking method includes steps S10 to S80.

As illustrated in FIG. 5, the controller 10 recognizes in step S10 that the reception unit 14 has accepted the specification information. Next, in step S15, the controller 10 controls the microwave supply unit 12 such that the microwave supply unit 12 starts supplying microwaves to the object to be heated with the specified intensity F1.

In step S20, it is determined whether the given time period Pt has elapsed after the microwave supply unit 12 starts supplying microwaves. In a case where a negative determination (No) is made in step S20, the process proceeds again to step S20. On the other hand, in a case where a positive determination (Yes) is made in step S20, the process proceeds to step S25.

In step S25, the controller 10 controls the image capturing unit 13 such that an image of the object to be heated is captured. As a result, the image capturing unit 13 captures an image of the object to be heated.

In step S30, the controller 10 controls the microwave supply unit 12 such that the intensity F of the microwaves reduced. For example, the controller 10 controls the microwave supply unit 12 such that the intensity F of the microwaves is reduced from the specified intensity F1 to the reduced intensity F2.

In step S35, the controller 10 controls the communication unit 16 such that the image capturing result of the image capturing unit 13 is transmitted to the server 2. As a result, the communication unit 10 transmits the image capturing result to the server 2.

In step S40, the controller 10 determines whether the transmission of the image capturing result by the communication unit 16 is successful. In a case where a negative determination (No) is made in step S40, that is, in a case where the transmission of the image capturing result the communication unit 16 has failed, the process proceeds to step S30, and the controller 10 controls the microwave supply unit 12 such that the intensity F of the microwaves is further reduced. In other words, the controller 10 controls the microwave supply unit 12 such that the intensity F of the microwaves supplied by the microwave supply unit 12 is reduced according to the transmission result of the image capturing result with respect to the server 2 from the communication unit 16. On the other hand, in a case where a positive determination (Yes) is made in step S40, that is, in a case where the transmission of the image capturing result by the communication unit 16 is successful, the process proceeds to step S45.

In step S45, the controller 10 acquires the reduction time period TR. The reduction time period TR is a time in which the microwave supply unit 12 is controlled such that microwaves are supplied with the reduced intensity F2 that is less than the specified intensity F1. In FIG. 5, the reduction time period TR is, for example, the time period from step S30 to step S40.

In step S50, the controller 10 calculates an amount of energy Enr of the microwaves in the reduction time period TR, and the process proceeds to step S53 of FIG. 6.

As illustrated in FIG. 6, in step S53, the controller 10 calculates the increased intensity F3, the first time period T1, the second time period T2, and the extended time period Et on the basis of the amount of energy Enr calculated in step S50 of FIG. 5. Note that, each time the controller 10 executes the process of step S53, the controller 10 updates the extended time period Et by adding the calculated extended time period Et to the extended time period Et calculated by executing the process of the previous step S53. The controller 10 totals up extended time periods Et calculated at intervals of the given time period Pt. The controller 10 causes the storage 11 to store the total extended time period Et.

In step S55, the controller 10 controls the microwave supply unit 12 such that microwaves are supplied with the increased intensity F3 over the first time period T1. As a result, the microwave supply unit 12 supplies microwaves with the increased intensity F3 over the first time period T1.

In step S60, the controller 10 controls the microwave supply unit 12 such that microwaves are supplied with the specified intensity F1 over the second time period T2. As a result, the microwave supply unit 12 supplies the microwaves with the specified intensity F1 over the second time period T2.

In step S65, the controller 10 determines whether the specified time period At has elapsed. In a case where a negative determination (No) is made in stein S65, that is, in a case where the specified time period At has not elapsed after the microwave supply unit 12 starts supplying microwaves, the process proceeds to step S20 in FIG. 5, and the controller 10 again causes the image capturing unit 13 to capture an image of the object to be heated. On the other hand, in a case where a positive determination (Yes) is made in step S65, that is, in a case where the specified time period At has elapsed after the microwave supply unit 12 starts supplying microwaves, the process proceeds to step S70.

In step S70, the controller 10 determines whether the extended time period Et totaled up in step S53 is less than the predetermined time period Qt. Specifically, the controller 10 determines whether the extended time period Et totaled up in step S53 and stored in the storage 11 is less than the predetermined time period Qt. In a case where a positive determination (Yes) is made in step S70, that is, in a case where the extended time period Et is less than the predetermined time period Qt, the microwave supply unit 12 is controlled such that the supply time period St of the microwaves is maintained, and the process ends. On the other hand, in a case where a negative determination (No) is made in step S70, that is, in a case where the extended time period Et is greater than or equal to the predetermined time period Qt, the process proceeds to step S75.

In step S75, the controller 10 controls the microwave supply unit 12 such that microwaves are supplied over the extended time period. Et. As a result, the microwave supply unit 12 supplies microwaves over the extended time period Et.

In step S80, the controller 10 causes the display unit 40 to display a message indicating that the heating time of the object to be heated has been extended. As a result, the display unit 40 displays the message indicating that the heating time of the object to be heated has been extended.

The embodiment of the disclosure has been described above with reference to the drawings. However, the disclosure is not limited to the embodiment described above, and it is possible to implement the disclosure in various modes without departing from the gist of the disclosure. Further, the disclosure can be made in various forms by appropriately combining a plurality of components disclosed in the embodiment. For example, several components may be deleted from all of the components described in the embodiment. For easier understanding, the drawings schematically illustrate the respective main components, and the number of illustrated components, or the like may differ from the actual number of components for the sake of convenience in creating the drawings. In addition, each of the components described in the above embodiment is exemplary and is not particularly limited, and various modifications can be made within a range that does not substantially depart from the effects of the disclosure.

(1) As described with reference to FIGS. 2 to 4, the controller 10 controls the microwave supply unit 12 such that microwaves are supplied with the reduced intensity F2 while the communication unit 16 transmits the image capturing result to the server 2. However, the controller 10 may set the intensity F of the microwaves while the communication unit 16 transmits the image capturing result to the server 2 to 0 as long as the intensity F of the microwaves is reduced to be less than the intensity F of the microwaves before the communication unit 16 transmits the image capturing result to the server 2 while the communication unit 16 transmits the image capturing result to the server 2. In this case, the microwave supply unit 12 stops operating while the communication unit 16 transmits the image capturing result to the server 2. Note that, in the case where the controller 10 sets the intensity F of the microwaves to 0, the microwave supply unit 12 has a special system for the heater of the magnetron 121. The special system is, for example, a system for constantly heating the heater of the magnetron 121 and may be described as a hot start.

(2) The order of processes from step S10 of FIG. 5 to step S80 of FIG. 6 may be changed as appropriate.

(3) As described with reference to FIGS. 2 to 4, after the communication unit 16 transmits the image capturing result, the controller 10 controls the microwave supply unit 12 such that microwaves are supplied with the specified intensity F1 after microwaves are supplied with the increased intensity F3. However, as long as at least one of the intensity F of the microwaves and the supply time period St of the microwaves is increased after the communication unit 16 transmits the image capturing result, the controller 10 may control the microwave supply unit 12 such that microwaves are supplied with the specified intensity F1 and then supplied with the increased intensity F3 after the communication unit 16 transmits the image capturing result.

(4) As described with reference to FIG. 5, after the image capturing unit 13 captures an image of the object to be heated, the controller 10 controls the microwave supply unit 12 such that the intensity F of the microwaves is reduced.

However, after the controller 10 controls the microwave supply unit 12 such that the intensity F of the microwaves is reduced, the image capturing unit 13 may capture an image of the object to be heated.

(5) As described with reference to FIG. 4, the controller 10 controls the microwave supply unit 12 such that the intensity F of the microwaves is reduced to the reduced intensity F2 and the second reduced intensity F4 twice in the reduction time period TR. However, until the transmission of the image capturing result to the server 2 by the communication unit 16 is completed, the controller 10 may control the microwave supply unit 12 such that the intensity F of the microwaves reduced three or more times.

INDUSTRIAL APPLICABILITY

The disclosure is applicable in the field of heating cooking apparatuses and heating cooking methods.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A heating cooking apparatus comprising:
   a microwave supply unit configured to supply microwaves to an object to be heated and heat the object to be heated;
   an image capturing unit configured to capture an image of the object to be heated;
   a communication unit configured to transmit an image capturing result generated by the image capturing unit to an external apparatus; and
   a controller configured to control the microwave supply unit such that an intensity microwaves is reduced to be less than an intensity of microwaves before the communication unit transmits the image capturing result while the communication nit transmits the image capturing result to the external apparatus,
   wherein the controller controls the microwave supply unit such that at least one of an intensity of microwaves or a supply time period of the microwaves is increased after the communication unit transmits the image capturing result.

2. The heating cooking apparatus according to claim 1, further comprising:
   a reception unit configured to receive specification information on microwaves supplied to the object to be heated in advance,
   wherein the specification information indicates at least one of a specified time period in which microwaves are supplied to the object to be heated or a specified intensity of microwaves supplied to the object to be heated, and
   the controller determines at least one of an intensity of microwaves after the communication unit transmits the image capturing result or an extended time period for supplying microwaves for an extended time period with respect to the specified time period on the basis of a predicted total amount of energy predicted on the basis of the specification information.

3. The heating cooking apparatus according to claim 1, wherein the controller calculates an amount of energy of microwaves for a reduction time period in which an intensity of microwaves supplied by the microwave supply unit is reduced on the basis of the reduction time period and the intensity of the microwaves in the reduction time period, and
   controls the microwave supply unit such that an amount of energy of microwaves after the communication unit transmits the image capturing result is increased on the basis of the amount of energy for the reduction time period.

4. The heating cooking apparatus according to claim 1, further comprising:
   a reception unit configured to receive specification information on microwaves supplied to the object to be heated in advance,
   wherein the specification information indicates a specified intensity of microwaves to be supplied to the object to be heated, and
   the controller controls the microwave supply unit such that an intensity of microwaves after the communication unit transmits the image capturing result is increased to over the specified intensity while the supply time period is maintained on the basis of an amount of energy of microwaves in a reduction time period in which an intensity of microwaves supplied by the microwave supply unit is reduced.

5. The heating cooking apparatus according to claim 1, further comprising:
   a reception unit configured to receive specification information on microwaves supplied to the object to be heated in advance,
   wherein the specification information indicates a specified time period in which microwaves are supplied to the object to be heated, and
   the controller calculates an extended time period for supplying microwaves for an extended time period with respect to the specified time period on the basis of an amount of energy of microwaves in a reduction time period in which an intensity of microwaves supplied by the microwave supply unit is reduced, controls the microwave supply unit such that microwaves are supplied to the object to be heated over the extended time period in a case where the extended time period is greater than or equal to a predetermined time period, and controls the microwave supply unit such that the supply time period is maintained in a case where the extended time period is less than the predetermined time period.

6. The heating cooking apparatus according to claim 1, wherein the controller reduces an intensity of microwaves supplied by the microwave supply unit according to a transmission result of the image capturing result with respect to the external apparatus by the communication unit.

7. The heating cooking apparatus according to claim 1, wherein the microwave supply unit includes a magnetron and an inverter circuit configured to drive the magnetron.

8. A heating cooking method comprising:
   supplying microwaves to an object to be heated,
   capturing an image of the object to be heated,
   transmitting an image capturing result of the object to be heated to an external apparatus,
   reducing an intensity of microwaves to be less than an intensity of microwaves before the image capturing result is transmitted while the image capturing result is transmitted to the external apparatus, and increasing at least one of an intensity of microwaves or a supply time period of the microwaves after the image capturing result of the object to be heated is transmitted.

* * * * *